Patented Jan. 2, 1951

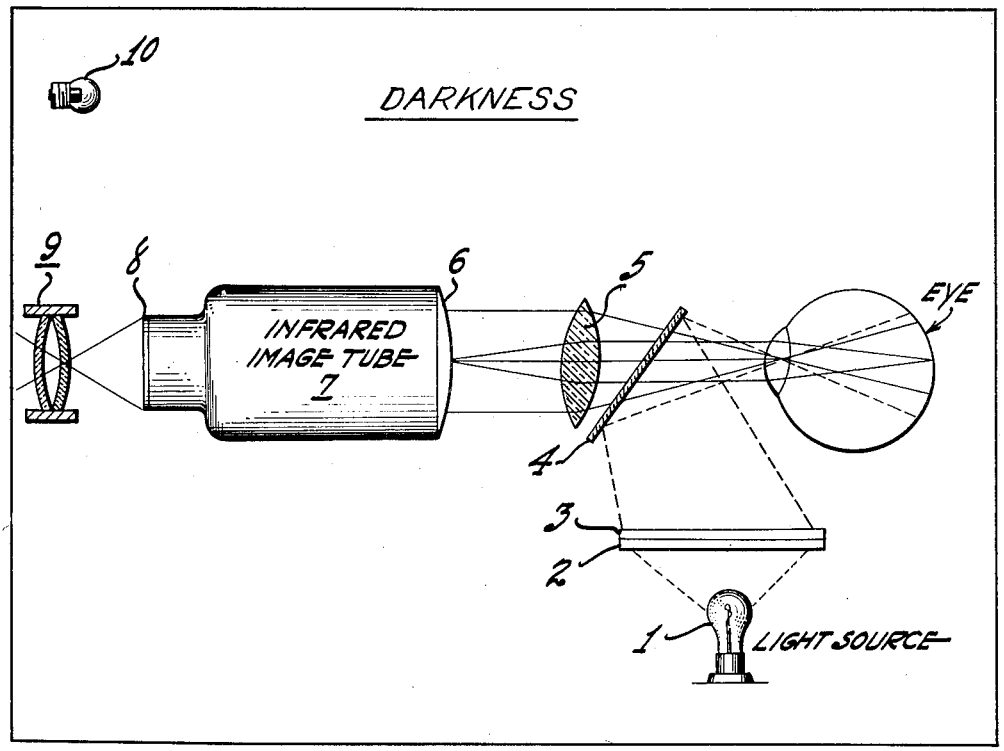

2,536,305

UNITED STATES PATENT OFFICE 2,536,305

ART OF EXAMINING THE EYE WITH INFRARED RAYS

George A. Morton, Princeton, N. J., assignor to Radio Corporation of America, a corporation of Delaware Application May 27, 1946, Serial No. 672,575

6 Claims. (Cl. 88—20)

This invention relates to the art of examining the eye and has for its principal object to provide an improved method of and apparatus for inspecting the retina and other interior parts of the eye and observing the performance of the lens of the eye without the need of subjecting its pupil to treatment with a mydriatic substance, and which is not dependent on the accommodation of the observer's eye.

The foregoing and other objects are achieved in accordance with the invention by the provision of an ophthalmoscope employing infrared radiation to which the eye is substantially insensitive and by permitting the pupil to be expanded by dark adaptation instead of through the use of atropine or other drug. The infrared ophthalmoscope of the invention comprises an infrared illuminator, an associated optical system which permits illuminating the whole or a portion of the retina of the subject's eye, an optical system which images the subject's retina on the photosensitive cathode of an electron image tube, and an ocular for viewing the visible image formed on the fluorescent screen of the image tube.

The principle of the invention, and its simplest form, is shown in the accompanying drawing. Here the infrared system for illuminating the eye comprises a source of light such as an ordinary incandescent lamp 1, an infrared filter 2 (say a Wratten No. 87 or a Corning No. 2540). A diffusing screen 3 or other optical system may be used also if desired. The radiation falls on the glass plate 4 which reflects the infrared rays onto the subject's eyeball, illuminating the interior portions of the eye, including the retina and the fundus. The glass 4 may be coated with a non-reflecting film (not shown) on one side to avoid multiple reflections.

The lens of the subject's eye when thus illuminated will, if normal, be focused at infinity in darkness. The said lens in combination with a lens 5 forms an infrared image of the interior of the eye on the photosensitive cathode 6 of an electron image tube 7. Lens 5 may be made of almost any optical glass, since almost all optical glasses will transmit infrared in the spectral region.

The electron image tube 7 may conveniently be of the type shown in U. S. Patents 2,189,319, 2,189,320. 2,189,321 or 2,222,181 which issued on applications of the same inventor. Alternatively, the image tube may be similar to the ones shown in the joint copending appln. Ser. No. 701,588 filed October 5, 1946, now Patent 2,506,018, of Ruedy, Flory and Morton. Image tubes of the type described are sensitive to infrared radiation in the spectral region of from 7500 Å. to 13000 Å.

A visible reproduction of the infrared image impressed upon the photosensitive cathode 6 is formed on the fluorescent screen 8 of the image tube and this reproduction is viewed through a suitable ocular 9. This image may be photographed if desired.

If the patient's eye is not normal, the image of the retina will be blurred. It can be made sharp by focusing the lens 5, the extent of the refocusing being a measure of the near or farsightedness (myopic or hypermetropic) of the eye. The correction for sharpness may be made with correcting lenses as is done with conventional visual ophthalmoscopes.

As above indicated, when the pupil is dilated by natural adaption to darkness it is substantially insensitive to infrared rays. However, cases have been observed wherein the dilation of the pupil is not constant, but decreases and increases slightly with time. In such cases this variation may be minimized by directing the patient's eye to a dimly visible remotely disposed object such as a small neon light 10.

It will of course be apparent that the efficiency of operation can be enhanced by a more elaborate optical system than the one which has been selected for illustration. Thus, the prior art as to visual ophthalmoscopes suggests the use of an optical system which meets the following conditions: (a) that the retina be imaged on the cathode of the image tube (b) that the pupil of the subject's eye be conjugate with the objective lens system forming the image on the cathode and (c) that the pupil of the subject's eye be conjugate with the entrance pupil of the illuminating system.

One very real advantage of the method and apparatus of the present invention resides in the fact that the accommodation of the observer's eye cannot introduce errors in the results obtained with the instrument. The focus of the image on the cathode of the image tube depends only upon the nature and adjustment of the optical system 5. If this is incorrectly adjusted, the observer cannot obtain a sharp image by reaccommodating his eye as is the case with most ophthalmoscopes. Other advantages are the ranges of magnification and angular fields of view which can be obtained by using various different optical systems at 5.

What is claimed is:

1. The method of examining the eye which comprises subjecting the eye to darkness, permitting the pupil to dilate by natural adaptation to said darkness, illuminating said dark-adapted eye with invisible rays to which said dilated pupil is substantially insensitive whereby some of said rays are reflected to form an invisible image of the interior of said eye, and simultaneously converting said invisible image into a visible image.

2. The method of examining, without the use of a mydriatic substance, the retina of the eye, said method comprising, subjecting the eye to darkness, permitting the pupil to dilate by natural adaptation to said darkness, directing infrared rays through said dilated pupil upon said retina whereby some of said rays are reflected through said dilated pupil to form an infrared image of said retina, picking-up said infrared image and simultaneously converting it into an optical image.

3. An ophthalmoscope comprising, in combination, means for illuminating the eye with invisible rays to which the pupil of said eye is substantially insensitive whereby some of said rays are reflected and emerge from said pupil to form an invisible image of the interior of said eye, and means independent of the accommodation of the observer's eye for simultaneously converting said invisible image into a visible image.

4. Apparatus for observing the interior of the eye comprising, in combination, means for illuminating the eye with invisible rays to which the pupil of said eye is substantially insensitive whereby some of said rays are reflected and emerge from said pupil to form an invisible image of the interior of said eye, and photoelectric means for simultaneously converting said invisible image into an optical image.

5. An ophthalmoscope comprising, in combination, a source of infrared rays to which a dilated pupil is insensitive, means for directing rays from said source through said pupil whereby some of said rays are reflected through said pupil to form an infrared image of the interior of said eye, and an electron-image device having a photosensitive image-cathode mounted in the path of said reflected rays for simultaneously translating said infrared image into a visible image of the interior of said eye.

6. Apparatus for observing the interior of the eye, comprising, in combination, means for subjecting the eye to darkness whereby the pupil of said eye is dilated by dark adaptation, means for illuminating said eye with infrared rays to which said dark adapted pupil is substantially insensitive whereby some of said rays are reflected and form an invisible image of the interior of said eye, photoelectric means for simultaneously converting said invisible image into a visible optical image, and means mounted remote from said eye and visible in said darkness upon which said eye may be focused for the purpose of maintaining the dilation of said pupil substantially constant.

GEORGE A. MORTON.

REFERENCES CITED

The following references are of record in the file of this patent:

UNITED STATES PATENTS

| Number | Name | Date |
|---|---|---|
| 1,385,657 | Bell et al. | July 26, 1921 |
| 1,969,852 | Markosek | Aug. 14, 1934 |
| 2,074,226 | Kunz et al. | Mar. 16, 1937 |
| 2,164,576 | Collins | July 4, 1939 |
| 2,189,319 | Morton | Feb. 6, 1940 |
| 2,257,331 | Clarke | Sept. 30, 1941 |

FOREIGN PATENTS

| Number | Country | Date |
|---|---|---|
| 522,148 | Great Britain | June 11, 1940 |

OTHER REFERENCES

Emsley, Text Visual Optics, 2nd ed., 1939, page 241, published by Hatton Press Ltd., 72 to 78 Fleet Street, London.

American Journal of Ophthalmology, volume 25, November 1942, pages 1358 and 1359, article by Feldman.

Archives of Ophthalmology, vol. 15, 1936, Feldman, pages 435, 436, 439 to 442.